United States Patent [19]

Fukui et al.

[11] Patent Number: 5,575,259

[45] Date of Patent: Nov. 19, 1996

[54] CONTROLLER FOR FOUR-STROKE CYCLE INTERNAL-COMBUSTION ENGINE

[75] Inventors: Wataru Fukui; Yutaka Ohashi, both of Tokyo, Japan

[73] Assignee: Mitsubishi Denki Kabushiki Kaisha, Tokyo, Japan

[21] Appl. No.: 578,025

[22] Filed: Dec. 26, 1995

[30] Foreign Application Priority Data

Aug. 10, 1995 [JP] Japan .................................. 7-204818

[51] Int. Cl.$^6$ ...................................................... F02P 5/00
[52] U.S. Cl. .................................................... 123/417
[58] Field of Search ................................... 123/417, 414, 123/494, 492, 493, 480, 488; 364/133, 131, 431.04, 431.05, 431.07

[56] References Cited

U.S. PATENT DOCUMENTS

| | | | |
|---|---|---|---|
| 4,762,105 | 8/1988 | Beyer et al. | 123/417 |
| 5,148,791 | 9/1992 | Nagano et al. | 123/417 |
| 5,184,590 | 2/1993 | Hashimoto et al. | 123/414 |
| 5,267,542 | 12/1993 | Keskula | 123/417 |
| 5,291,409 | 3/1991 | Richardson | 364/431.07 |

FOREIGN PATENT DOCUMENTS 6-137197  5/1994  Japan .

Primary Examiner—Raymond A. Nelli
Attorney, Agent, or Firm—Sughrue, Mion, Zinn, Macpeak & Seas

[57] ABSTRACT

A controller for a four-stroke cycle internal-combustion engine does not incur an operation failure in an engine even at the startup when injectors are placed under injection control at the same time and a cylinder group to be ignited is placed under ignition control at the same time. The controller for the four-stroke cycle internal-combustion engine has an angle detector for detecting the angle of rotation of a four-stroke cycle internal-combustion engine in synchronization with the rotation of the four-stroke cycle internal-combustion engine; an injector for injecting fuel which is provided for each cylinder of the four-stroke cycle internal-combustion engine; a plurality of ignition coils for generating high voltage for ignition for the respective cylinders; a fuel injection control unit for making the injectors inject fuel to the respective cylinders at the same time; and an ignition control unit for performing control by applying high voltage from the ignition coils so that the spark plugs may discharge at the same time to a cylinder group to be ignited. The fuel injection control unit performs the fuel injection after a predetermined time from the moment the control of the ignition coils was performed.

3 Claims, 5 Drawing Sheets 5,575,259

CONTROLLER FOR FOUR-STROKE CYCLE INTERNAL-COMBUSTION ENGINE

BACKGROUND OF THE INVENTION

1. Field of the Invention

The present invention relates to a controller designed to perform simultaneous fuel injection to all cylinders and simultaneous ignition control for each group of cylinders, which is to be ignited, of a four-stroke cycle internal-combustion engine (hereinafter referred to simply as "engine") and, more particularly, to a controller for the four-stroke cycle internal-combustion engine, which controller realizes better engine controllability by preventing a problem at the time of controlling the simultaneous ignition especially at start-up or the like.

2. Description of the Related Art

A conventional four-stroke cycle internal-combustion engine electronically controls the fuel injection timing, the ignition control timing, and the like of the engine by generating a positional signal for each cylinder which synchronizes with the revolution of the engine and by controlling the fuel injection timing and the ignition timing in accordance with the positional signal. Normally, a well-known rotation signal generator designed for detecting the rotation of a camshaft or a crankshaft of an engine is used as the means for generating a positional signal which corresponds to the reference position of each cylinder.

FIG. 6 is a block diagram showing a typical controller for a four-stroke cycle internal-combustion engine. In the drawing, a rotation signal generator 9 functioning as an angle detector issues an angle signal POS of the engine and a reference position signal REF which corresponds to each cylinder. Various sensors 10 other than the rotation signal generator 9 detect the operating state of the engine and output operating state information D.

The angle signal POS, the reference position signal REF, and the operating state information D (sensor signals) are supplied to a microprocessor 12, which carries out fuel injection control and ignition control, via an input interface circuit 11. The microprocessor 12 drives an injector 14 for injecting fuel and also alternately drives ignition coils 15 and 16 for generating high voltage for ignition via an output interface circuit 13.

The injector 14 injects fuel to all cylinders at each control timing and the ignition coils 15 and 16 are driven for each group of cylinders to be ignited, which has a different control timing and which will be discussed later, thereby performing the simultaneous ignition control for each group of cylinders.

The input interface circuit 11, the microprocessor 12, and the output interface circuit 13 constitute an electronic control unit (ECU) 100 for controlling the engine. The microprocessor 12 includes a fuel injection control unit for injecting fuel to each cylinder at the same time and an ignition control unit for performing control so as to cause a spark plug (not shown) to be simultaneously discharged for a cylinder group to be ignited.

FIG. 7 is a perspective view showing a specific example of the configuration of the rotation signal generator 9 shown in FIG. 6. FIG. 8 is a circuit diagram with a partial block diagram showing the position signal generator in the rotation signal generator 9. In FIG. 7, a rotary shaft 1 which rotates in synchronization with an engine is integrally connected to a camshaft which, for example, rotates once in synchronization with one cycle of the operation of each cylinder of the engine. The camshaft reduces the number of revolutions of a crankshaft (not shown), which is directly connected to the engine, to a half.

A rotary disc 2 attached to the rotary shaft 1 has a plurality of slit windows 3 and 4 which are provided equidistantly in the direction of rotation (indicated by the arrow).

The positions of the windows 3 are keyed to the angle signal POS which is issued repeatedly for every predetermined angle of the engine; the positions of the windows 4 are keyed to the reference position (predetermined angle of rotation) signal REF for each cylinder.

This example shows a case where the four-stroke cycle internal-combustion engine has four cylinders (#1 to #4); the outer periphery of the rotary disc 2 has the slit windows 3 for generating the angle signal POS which reverses at every predetermined angle of the engine; and four windows 4 for generating the reference position signal REF for each cylinder are provided in the middle of the rotary disc 2.

The end of each window 4 which is located at the front with respect to the direction of rotation is keyed to the reference position of each cylinder. The width of each window 4 differs in the respective cylinders (#1 to #4), so that a particular cylinder and each cylinder can be identified by measuring the width of the window 4.

A pair of light emitting diodes 5 are arranged to face the windows 3 and 4, respectively; a pair of photodiodes 6 are arranged to receive light emitted from the light emitting diodes 5 through the windows 3 and 4. These light emitting diodes 5 and the photodiodes 6 constitute two pairs of photo couplers.

In FIG. 8, an amplifier 7 amplifies the output signals issued by the photo diodes 6. An output transistor 8 with open collector (with common emitter) has its base connected to the output terminal of the amplifier 7. The collector terminal of the output transistor 8 is connected to the input interface circuit 11 (see FIG. 6).

It should be noted that a plurality of circuits having the same configuration as that shown in FIG. 8 are provided for the respective windows 3 and 4 although the example shows only one train for the purpose of convenience.

FIG. 9 shows the waveforms indicative of the timings for generating the angle signal POS and the reference position signal REF.

In FIG. 9, the positional signal obtained based on the windows 3 is the angle signal POS; the positional signal obtained based on the windows 4 is the reference position signal REF which provides the crank angle reference signal and it reverses at a predetermined crank angle for each of the cylinders #1 to #4.

The reference position signal REF used to control the timings for the fuel injection and ignition of the engine indicates that each rise coincides with a crank angle reference position B110 degrees (110 degrees before reaching a top dead center TDC) for each cylinder; the signal width thereof differs to enable the respective cylinders to be identified. The pulse width of each reference position signal REF is set to about 8, 12, 16, and 20 degrees in terms of the crank angle, for example.

FIG. 10 is an illustrative diagram showing the fuel injection controlling procedure (the hatched portions) of the injector 14 at the start-up and the ignition controlling procedure (indicated by the arrows) of the ignition coils 15 and 16. The fuel injection timing and the ignition control timing are keyed to the respective cylinders (#1 to #4) to provide a timing chart shown in time series.

In FIG. 10, the cycle related to the cylinders (#1 to #4) consists of four strokes, namely, the induction stroke, the compression stroke, the power stroke, and the exhaust stroke. In the order of #1, #3, #4, and #2, the cycles are shifted by one stroke.

The fuel injection timing (hatched) for each cylinder corresponds to the crank angle reference position (B110 degrees). The ignition control timing (arrow) for the spark plug of each cylinder corresponds to the moment immediately following the compression.

In this case, the fuel injection is performed for a single cylinder by a bisectional control method. For cylinder #1, for example, the first fuel injection (hatched) is carried out during the power stroke immediately after the ignition control (arrow), then the second fuel injection (hatched) is implemented during the induction stroke following the exhaust stroke. Thus, the required amount of fuel is supplied in two steps.

In the cycle immediately after the startup (leftmost cycle in FIG. 10), only fuel injection is performed and no ignition control is performed (no stroke indicated by the arrow is given).

The operation of the controller for the conventional four-stroke cycle internal-combustion engine shown in FIG. 6 through FIG. 8 will now be described with reference to FIG. 9 and FIG. 10.

When the rotary shaft 1 and the rotary disc 2 rotate as the engine starts, the rotation signal generator 9 generates the two types of positional signals, namely, the angle signal POS and the reference position signal REF (see FIG. 9).

More specifically, the photodiodes 5 of the two pairs of photo couplers, which are arranged so that they face against each other with the windows 3 and 4 of the rotary disc 2 located between them, generate pulse signals which rise at the front ends of the respective slits constituting the windows 3 and 4 and fall at the rear ends thereof. The amplifier 7 and the output transistor 8 shape the waveform of the pulse signals to issue the angle signal POS and the reference position signal REF.

The angle signal POS and the reference position signal REF are supplied to the microprocessor 12 via the input interface circuit 11; the microprocessor 12 issues a control signal via the output interface circuit 13 and drives the injector 14 in synchronization with the rise of the reference position signal REF so as to supply fuel to the respective cylinders. The microprocessor 12 also measures the signal width of the reference position signal REF in accordance with the count value of the angle signals POS and as soon as it identifies the reference position signal REF of a particular cylinder, it drives the ignition coil 15 or 16 of the cylinder group.

The operation stated above will now be described in detail in conjunction with FIG. 10.

First, when the microprocessor 12 detects the rise of the reference position signal REF (reference position B110 degrees of each cylinder), it simultaneously drives and controls the injectors 14 of all cylinders. Then, the microprocessor 12 detects the pulse signal width of the reference position signal REF by counting the angle signals POS so as to identify the cylinder which corresponds to the present crank angle reference position B110 degrees.

Upon completion of the detection of the cylinder, the microprocessor 12 replaces the crank angle reference position B110 degrees with the timing reference position for the ignition control and drives and controls the ignition coil 15 or 16 which corresponds to the cylinder group which is to be ignited and controlled simultaneously (#1 and #4 or #3 and #2) (see the arrows shown in FIG. 10).

After that, the drive and control of the injector 14 is performed once for each rotation of the crankshaft (half the rotation of the camshaft). The ignition control by driving the ignition coils 15 and 16 is carried out once for each half rotation of the crankshaft (a quarter rotation of the camshaft); it is repeated alternately on the groups of cylinders to be ignited.

The aforesaid conventional four-stroke cycle internal-combustion engine controller, however, presents the following problem especially at the time of starting the engine.

The ignition timing (timing point A shown in FIG. 10) in cylinder #3 coincides with the point immediately after the exhaust stroke of cylinder #2, i.e. immediately before the induction stroke, and it corresponds to the ignition control timing for the cylinder on the dead ignition side. Hence, at timing point A, the discharge timing of the spark plug for the cylinder on the dead ignition side (cylinder #2), which timing is controlled by the ignition control processing, in the group of cylinders (#3 and #2) corresponds to the point immediately before the induction stroke (latter half of the exhaust stroke), thus overlapping the timing at which the intake valve is opened.

At the upstream of the intake valve, the injector 14 is driven at two different timings (during the compression stroke and the exhaust stroke) before the present ignition control is performed, thus rendering a condition in which the injected fuel is charged and an air-fuel ratio enabling combustion is obtained. Therefore, when the intake valve is opened, the cylinder on the dead ignition side is fired, resulting in a problem of a backfire into an intake port.

The problem, as stated above, tends to take place when the engine is started up whereas it is unlikely to happen during the normal operation. This is because during the normal operation, once the combustion is accomplished in a cylinder by the ignition control, the required fuel will not be accumulated at the upstream of the intake valve unless two fuel injections follow.

Thus, the conventional controller for the four-stroke cycle internal-combustion engine is designed to perform the fuel injection control for all the cylinders in two steps and carry out the simultaneous ignition control of the cylinder group immediately after the second fuel injection, presenting a problem such as a backfire into the intake port due to a cylinder on the dead ignition side being ignited especially at the startup of the engine.

SUMMARY OF THE INVENTION

The present invention has been achieved with a view toward solving the problem described above and it is an object of the present invention to provide a controller for a four-stroke cycle internal-combustion engine which does not pose a problem with the operation of the engine even at the startup when the simultaneous injection control of injectors and the simultaneous ignition control of a cylinder group to be ignited are performed.

According to one aspect of the present invention, there is provided a controller for a four-stroke cycle internal-combustion engine which is equipped with: an angle detector for detecting the angle of rotation of a four-stroke cycle internal-combustion engine in synchronization with the rotation of the four-stroke cycle internal-combustion engine; an injector for injecting fuel which is provided for each cylinder of the four-stroke cycle internal-combustion engine; a plurality of ignition coils for generating high voltage for ignition for the respective cylinders; a fuel injection control unit for making the injectors inject fuel to the respective cylinders at the same time; and an ignition control unit for performing control by applying the high voltage from the ignition coils so that the spark plugs may discharge at the same time to a cylinder group to be ignited; wherein the fuel injection control unit performs fuel injection after a predetermined time from the control timing of the ignition coils.

According to another aspect of the present invention, there is provided a controller for the four-stroke cycle internal-combustion engine which is equipped with: an angle detector for detecting the angle of rotation of a four-stroke cycle internal-combustion engine in synchronization with the rotation of the four-stroke cycle internal-combustion engine; an injector for injecting fuel which is provided for each cylinder of the four-stroke cycle internal-combustion engine; a plurality of ignition coils for generating high voltage for ignition for the respective cylinders; a fuel injection control unit for making the injectors inject fuel to the respective cylinders at the same time; and an ignition control unit for performing control by applying the high voltage from the ignition coils so that the spark plugs may discharge at the same time to a cylinder group to be ignited; wherein the ignition control unit carries out control so that the discharge of the spark plugs may be completed by the time the intake valves are opened for the respective cylinders.

According to still another aspect of the present invention, there is provided a controller for the four-stroke cycle internal-combustion engine which is equipped with: an angle detector for detecting the angle of rotation of a four-stroke cycle internal-combustion engine in synchronization with the rotation of the four-stroke cycle internal-combustion engine; an injector for injecting fuel which is provided for each cylinder of the four-stroke cycle internal-combustion engine; a plurality of ignition coils for generating high voltage for ignition for the respective cylinders; a fuel injection control unit for making the fuel injectors inject fuel to the respective cylinders at the same time; and an ignition control unit for performing control by applying the high voltage from the ignition coils so that the spark plugs may discharge at the same time to a cylinder group to be ignited; wherein the ignition control unit controls the ignition coils before controlling the fuel injection immediately after the four-stroke cycle internal-combustion engine is started up.

DESCRIPTION OF THE PREFERRED EMBODIMENTS

Figure 6:
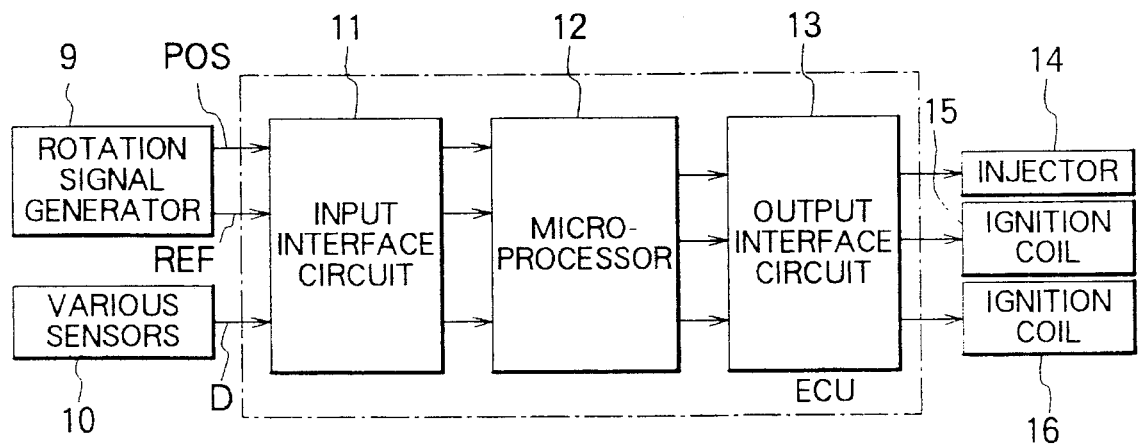
FIG. 6 is a block diagram showing a typical controller for a four-stroke cycle internal-combustion engine.
Figure 7:
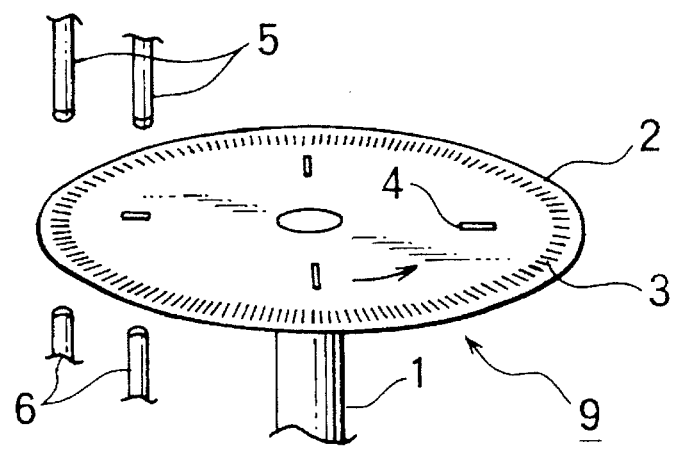
FIG. 7 is a perspective view showing a specific configuration example of the rotation signal generator shown in FIG. 6.
Figure 8:
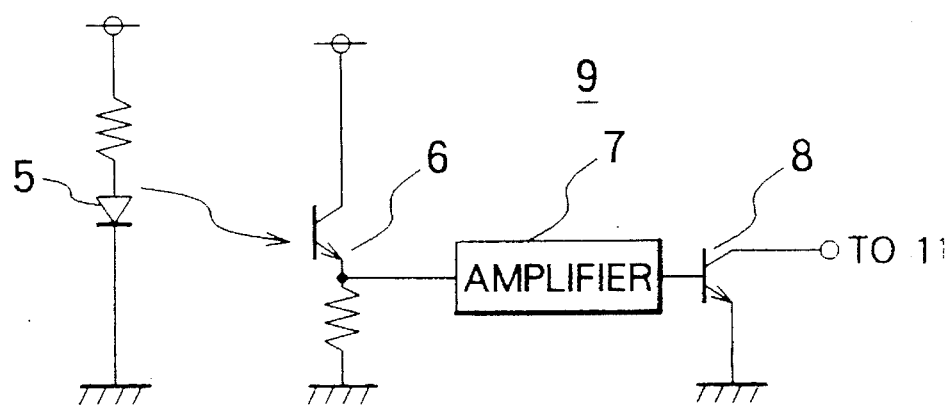
FIG. 8 is a circuit diagram partly shown in a block diagram illustrative of the circuit configuration of the rotation signal generator of FIG. 6.
Figure 9:
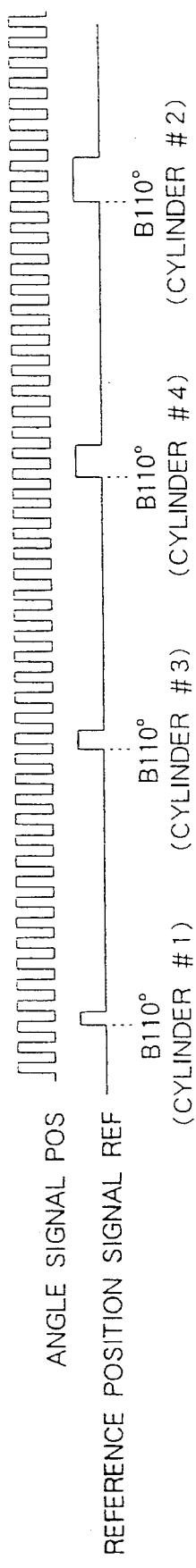
FIG. 9 is a waveform diagram showing the angle signal and the reference position signal generated by the rotation signal generator of a conventional controller for the four-stroke cycle internal-combustion engine.
Figure 10:
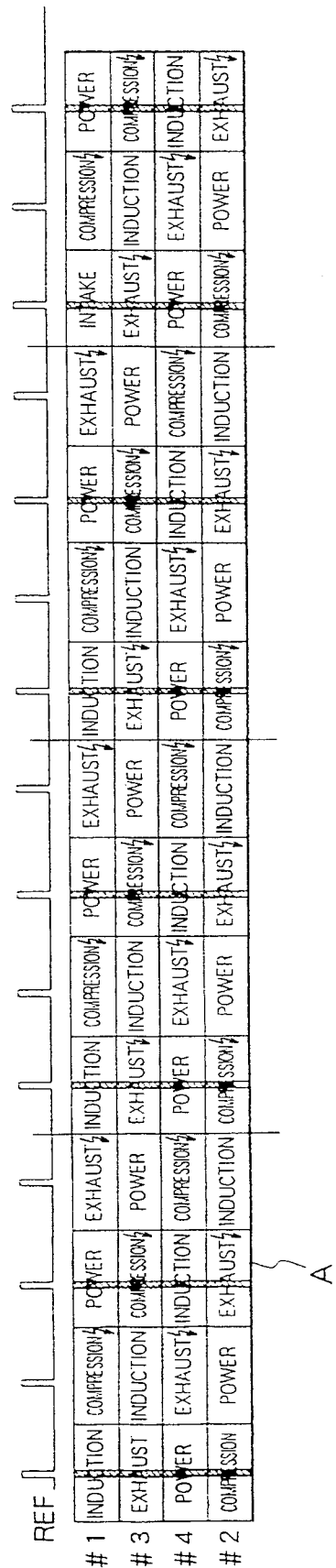
FIG. 10 is an illustration showing the operation timings of the fuel injection control and the ignition control performed by the conventional controller for the four-stroke cycle internal-combustion engine.

First Embodiment:

The first embodiment of the present invention will be described with reference to the accompanying drawings. The schematic configuration of the whole controller according to the first embodiment is the same as that shown in FIG. 6 through FIG. 8 except for the positions of the windows 4 in the rotary disc 2 of the rotation signal generator 9 (the waveform of the reference position signal REF) and the function of the microprocessor 12 in the ECU 100.

Figure 1:
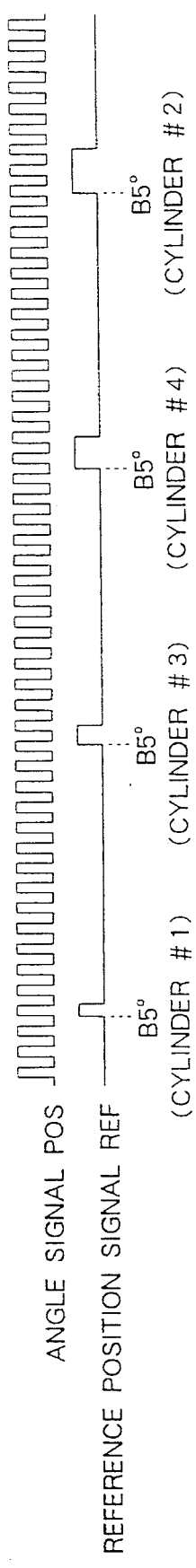
FIG. 1 is a waveform diagram illustrating the angle signal and the reference position signal generated by a rotation signal generator of a first embodiment in accordance with the present invention.

FIG. 1 shows the waveform indicative of the output signals of the rotation signal generator 9 in accordance with the first embodiment of the present invention. The POS and REF are the same as those described above.

In this embodiment, the crank angle for the rise of the reference position signal REF is set to 5 degrees before the top dead center TDC (B5 degrees).

The pulse width of the reference position signal differs from one cylinder to another; any particular cylinder and the respective cylinders are detected by counting the angle signals POS. This allows a corresponding cylinder to be identified at the falling point of the current reference position signal REF.

Figure 2:
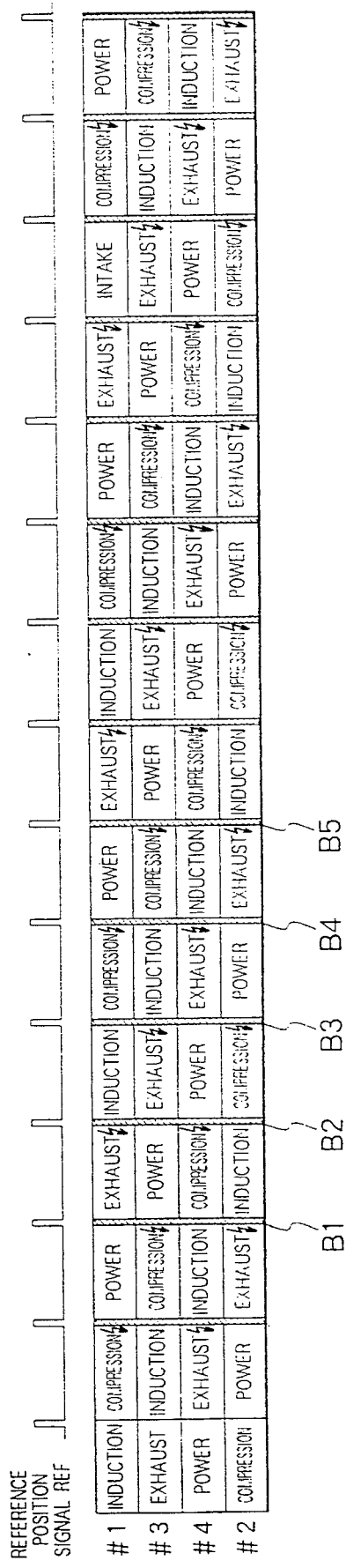
FIG. 2 is a chart showing the operation timings of the fuel injection control and the ignition control in the first embodiment in accordance with the present invention.

FIG. 2 is an illustration of the timing chart which shows the fuel injection control and the ignition control in the first embodiment of the present invention. The hatched sections and the sections indicated by arrows are the same as those described above.

In this embodiment, the rise timing of the reference position signal REF is B5 degrees and the drive control timing (B5 degrees) of the injectors 14 is reached immediately after the ignition control timing (e.g. approximately B10 degrees).

The fuel injection control for all the cylinders and the ignition control for the respective cylinders are implemented once every half rotation of the crankshaft (a quarter rotation of the camshaft).

It should be noted, however, that neither the fuel injection control nor the ignition control is performed during the first cycle (the leftmost cycle in FIG. 2) at the engine startup.

The operation of the first embodiment in accordance with the present invention will now be described with reference to FIG. 6 through FIG. 8 and FIG. 1 and FIG. 2.

Upon receipt of the reference position signal REF at the startup of the engine, as previously mentioned, the cylinder is identified in accordance with the pulse width of the reference position signal REF. As soon as the identification of the cylinder is completed, the ignition coil 15 or 16 for the cylinder group to be ignited is driven and controlled according to the reference position signal REF.

Then, the moment the reference position signal REF is received, the injectors 14 are driven and controlled to inject fuel to all the cylinders.

The amount of each fuel injection is one quarter of the total amount of the required fuel. The total amount of the fuel is injected in four steps every time the reference position signal REF is received until the full amount of the fuel is reached at the ignition control timing.

After that, every time the rise of the reference position signal REF (B5 degrees) is detected, the injectors 14 are driven and the ignition coils 15 and 16 for the cylinder group to be ignited are driven in succession.

In this case, at a point in the latter half of the exhaust stroke when the intake valve opens (in the vicinity of the upper TDC where the first half of the induction stroke is overlapped), the fuel supplied is controlled to two quarters at the most even during the control operation at the startup. More specifically, in the case of cylinder #2 on the dead ignition side at timing point B1, the fuel injection control is carried out twice, namely, first in the compression stroke and the second in the power stroke (no actual ignition control is implemented because it is the startup of the engine) before the dead ignition is given; therefore, two quarters of the total required amount of fuel is supplied.

Each ignition control timing lies at the crank angle position B10 degrees on the advance side from the control timing (B5 degrees) for the injectors 14; since it is before the fuel is injected, the amount of fuel supplied does not reach three quarters of the total amount.

Hence, at the time of startup, even sparking of the cylinder on the dead ignition side by the ignition coil 15 or 16 for the cylinder group to be ignited overlaps the timing at which the intake valve opens, the air-fuel ratio is still lean and the growth of the flame is suppressed, thus securely preventing such problems as a backfire.

Figure 3:
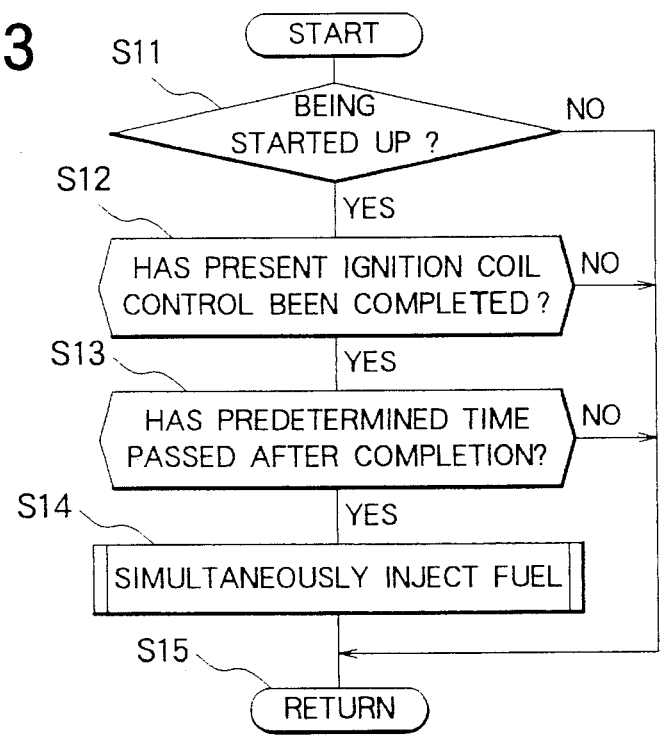
FIG. 3 is a flowchart showing the control processing implemented in the first embodiment in accordance with the present invention.

FIG. 3 is the flowchart showing a typical control specification for the fuel injection and ignition timings which includes the control operation of FIG. 2 according to the first embodiment of the present invention. The flowchart is indicative of a control routine for preventing the problem by optimizing (delaying) the fuel injection timing so that the cylinder on the dead ignition side of the cylinder group to be ignited is not fired at the time of startup.

The control operation of the first embodiment according to the present invention will now be described with reference to the flowchart given in FIG. 3.

In a step S11, the system determines whether the engine is being started up and if it determines that the engine is being started up (i.e. YES), then it proceeds to a step S12 wherein it determines whether the drive and control of the ignition coil 15 or 16 for the present cycle has been completed.

If the system decides that the ignition drive and control has been completed (i.e. YES), then it proceeds to a step S13 wherein it determines whether a predetermined time (e.g. 1 msec to 2 msec) has passed since the completion of the ignition drive and control.

If the system decides that the predetermined time has elapsed (i.e. YES) since the completion of the ignition drive and control, then it proceeds to a step S14 wherein it carries out simultaneous injection of fuel and further proceeds to a step S15 for return.

On the other hand, if the system decides that the conditions are not satisfied (i.e. NO) in any of the steps S11, S12, and S13, then it advances to the step S15 for return so as to terminate the processing of FIG. 3.

The processing stated above ensures that the fuel is injected after the predetermined time has elapses since the dead ignition was given. Hence, the air-fuel ratio of the deal ignition cylinder becomes smaller (leaner), thereby securely controlling the firing by the dead ignition.

In other words, the fuel is injected at the same time after the predetermined range, i.e. after the predetermined time, from the control timing of the ignition coils 15 and 16 so that the ignition coils 15 and 16 are controlled before the fuel ignition is controlled when the engine is started up, thereby controlling the operation timing of the fuel control and the ignition control so as to suppress the influences of the dead ignition. This prevents such problems as the backfire even at the startup.

Second Embodiment:

In the first embodiment described above, the simultaneous injection control of fuel is carried out after the predetermined time passes from the moment the ignition coils 15 and 16 are controlled. Alternatively, however, the control of the ignition coils 15 and 16, i.e. the discharge of the spark plugs, may be completed before the intake valve of a cylinder opens in the latter half of the exhaust stroke.

Figure 4:
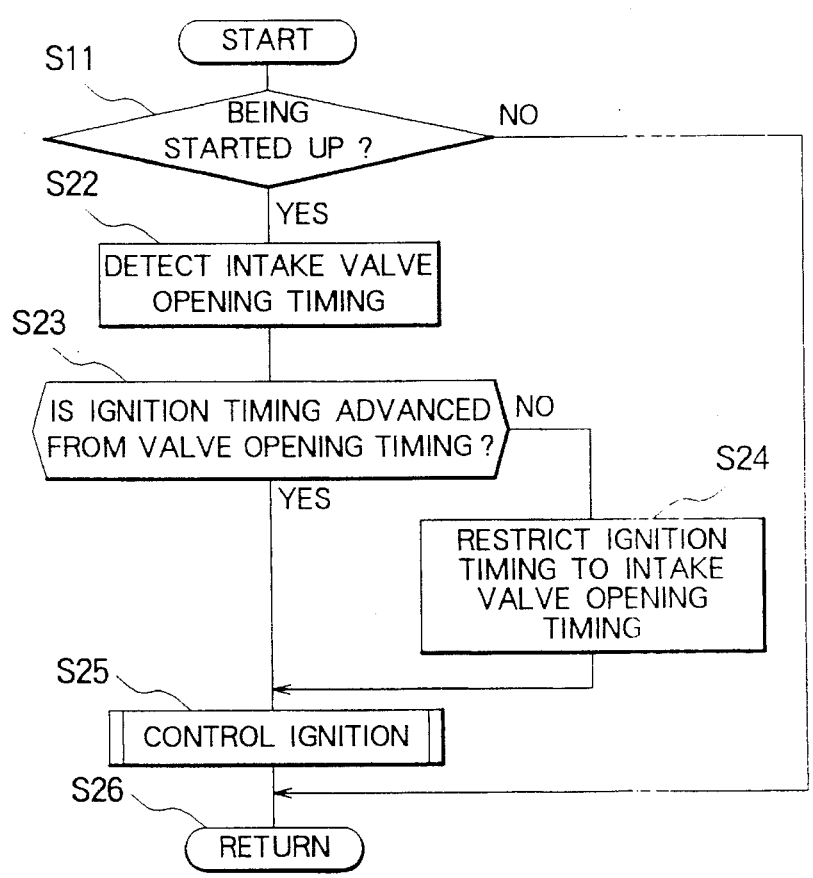
FIG. 4 is a flowchart showing the control processing implemented in a second embodiment in accordance with the present invention.

FIG. 4 is the flowchart illustrating the control operation in the second embodiment according to the present invention. The control operation is designed to carry out the ignition control before the intake valve is opened. The step S11 is identical to the one previously described.

In this embodiment, the ignition timing control range is restricted so that the drive of the ignition coils 15 and 16 is completed before the intake valve of the cylinder on the dead ignition side is opened, thereby preventing the cylinder on the dead ignition side of the cylinder group to be ignited from being fired at the startup.

The control operation performed by the second embodiment of the present invention will be described with reference to the flowchart of FIG. 4. The schematic configuration of the whole controller according to the second embodiment is the same as that shown in FIG. 6 through FIG. 8 except for the function of the microprocessor 12 in the ECU 100.

In the step S11, the system determines whether the engine is being started up and if it determines that the engine is being started up (i.e. YES), then it proceeds to a step S22 wherein it detects and checks the timing at which the intake valve of the cylinder on the dead ignition side opens.

Then in a step S23, the system compares the currently set ignition timing with the timing, at which the intake valve opens, and determines whether the ignition timing is ahead, i.e. on the advance side, of the intake valve opening timing.

If the system determines that the currently set ignition timing is later (on the delay side) than the intake valve opening timing (i.e. NO), then it restricts, in a step S24, the ignition timing so that the ignition is completed by the time the intake valve is opened.

Subsequently, in a step S25, the system controls the ignition according to the already restricted ignition timing, then it proceeds to a step S26 for return.

On the other hand, if the system determines in the step S23 that the currently set ignition timing is ahead, i.e. on the advance side, of the intake valve opening timing (i.e. YES), then it goes to a step S25 wherein it carries out the ignition control.

If the system decides in the step S11 that the engine is not being started up (i.e. NO), then it immediately goes to the step S26 for return to terminate the processing shown in FIG. 4.

Thus, the ignition timing is restricted before the intake valve is opened, making it possible to securely complete the discharge of the spark plugs by driving the ignition coils 15 and 16 by the time the intake valve is opened.

Hence, the problem such as the backfire does not take place in the cylinder on the dead ignition side during the simultaneous ignition control.

Third Embodiment:

In the first embodiment stated above, the ignition control is performed once at timing point B1 immediately after the startup, then the simultaneous injection control of fuel is performed; however, the simultaneous injection control of fuel may be carried out after the ignition control is carried out for a predetermined number of times.

Figure 5:
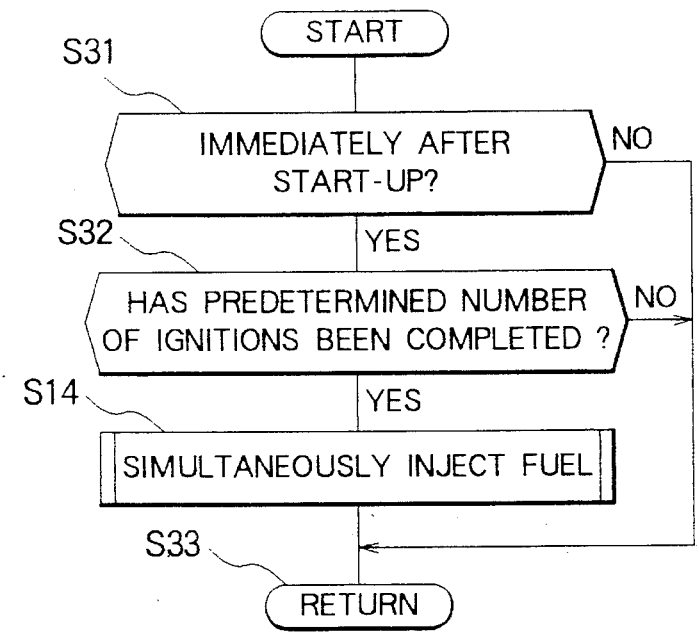
FIG. 5 is a flowchart showing the control processing implemented in a third embodiment in accordance with the present invention.

FIG. 5 shows the flowchart illustrative of the control procedure according to the third embodiment of the present invention, wherein the fuel injection control is implemented after the ignition control is performed for a predetermined number of times. The step S14 is identical to that described above.

In this embodiment, the problem is solved by optimizing the fuel injection control start timing so that the cylinder on the dead ignition side of a cylinder group to be ignited is not fired at the startup of the engine.

The control procedure according to the third embodiment of the present invention will now be described with reference to the flowchart of FIG. 5. In the third embodiment of the present invention, the schematic configuration of the whole controller is identical to that shown in FIG. 6 through FIG. 8 except for the function of the microprocessor 12 in the ECU 100.

In a step S31, the system determines whether the engine is being started up and if it determines that the engine is being started up (i.e. YES), then it proceeds to a step S32 wherein it determines whether the ignition control has been carried out for a predetermined number of times.

If the system decides that the ignition control has been performed for the predetermined number of times (i.e. YES), then it implements the simultaneous injection control of fuel in the step S14 before it goes to a step S33 for return to terminate the processing of FIG. 5.

On the other hand, if the system determines in the step S31 or S32 that the conditions are not satisfied (i.e. NO), then it immediately goes to the step S33 to terminate the processing shown in FIG. 5.

The processing stated above controls the fuel injection and ignition control activating timings so as to prevent the dead ignition of the engine from leading to a failure in the engine even when a cylinder group to be ignited is placed under the simultaneous ignition control at the startup in particular.

Thus, according to the present invention, an error in the air-fuel ratio caused by a residual fuel gas or the like, which has been injected before the startup, can be controlled and the air-fuel ratio and the injection timing at the startup can be optimized, thereby preventing the firing of the cylinder on the dead ignition side of a cylinder group to be ignited.

Further, even if the discharge of the dead ignition cylinder overlaps the intake valve opening timing during the simultaneous injection control of the injectors 14 and the simultaneous ignition control of a cylinder group to be ignited, the fuel, which has been injected, does not reach the required amount when the intake valve opens. Hence, the amount of the fuel charged in the cylinder is not enough to produce the air-fuel ratio enabling combustion when the intake valve is opened. This prevents the problem of the backfire into the intake port.

The first through third embodiments refer to the four-cylinder engine as the four-stroke cycle internal-combustion engine; however, it is needless to say that the present invention will provide the equivalent advantages when it is applied to a six-cylinder engine.

What is claimed is:

1. A controller for a four-stroke cycle internal-combustion engine, comprising:

an angle detector for detecting the angle of rotation of a four-stroke cycle internal-combustion engine in synchronization with the rotation of said four-stroke cycle internal-combustion engine;

an injector for injecting fuel which is provided for each cylinder of said four-stroke cycle internal-combustion engine;

a plurality of ignition coils for generating high voltage for ignition for said respective cylinders;

a fuel injection control unit for making said injectors inject fuel to the respective cylinders at the same time; and an ignition control unit for performing control by applying high voltage from said ignition coils so that the spark plugs may discharge at the same time to a cylinder group to be ignited; wherein said fuel injection control unit performs said fuel injection after a predetermined time has elapsed since the control of said ignition coils was performed.

2. A controller for the four-stroke cycle internal-combustion engine, comprising:

an angle detector for detecting the angle of rotation of a four-stroke cycle internal-combustion engine in synchronization with the rotation of said four-stroke cycle internal-combustion engine;

an injector for injecting fuel which is provided for each cylinder of said four-stroke cycle internal-combustion engine;

a plurality of ignition coils for generating high voltage for ignition for said respective cylinders;

a fuel injection control unit for making said injectors inject fuel to the respective cylinders at the same time; and an ignition control unit for performing control by applying high voltage from said ignition coils so that spark plugs may discharge at the same time to a cylinder group to be ignited; wherein said ignition control unit carries out control so that the discharge of said spark plugs may be completed by the time intake valves are opened for said respective cylinders.

3. A controller for the four-stroke cycle internal-combustion engine controller, comprising:

an angle detector for detecting the angle of rotation of a four-stroke cycle internal-combustion engine in synchronization with the rotation of said four-stroke cycle internal-combustion engine;

an injector for injecting fuel which is provided for each cylinder of said four-stroke cycle internal-combustion engine;

a plurality of ignition coils for generating high voltage for ignition for said respective cylinders;

a fuel injection control unit for making said fuel injectors inject fuel to said respective cylinders at the same time; and an ignition control unit for performing control by applying high voltage from said ignition coils so that spark plugs may discharge at the same time to a cylinder group to be ignited; wherein said ignition control unit controls said ignition coils before controlling said fuel injection immediately after said four-stroke cycle internal-combustion engine is started up.

* * * * *